United States Patent
Lin

(10) Patent No.: US 8,272,864 B2
(45) Date of Patent: Sep. 25, 2012

(54) INJECTION MOLD HAVING PRE-HEATING DEVICE, THE PRE-HEATING DEVICE, AND METHOD FOR PRE-HEATING INJECTION MOLD

(75) Inventor: Shu-Chen Lin, Taoyuan County (TW)

(73) Assignee: Quanta Computer Inc., Taoyuan Shien (TW)

( * ) Notice: Subject to any disclaimer, the term of this patent is extended or adjusted under 35 U.S.C. 154(b) by 167 days.

(21) Appl. No.: 12/801,771

(22) Filed: Jun. 24, 2010

(65) Prior Publication Data

US 2011/0140310 A1   Jun. 16, 2011

(30) Foreign Application Priority Data

Dec. 10, 2009 (TW) ................................ 98142363 A

(51) Int. Cl.
*B29C 45/73* (2006.01)
(52) U.S. Cl. ...................................................... 425/547
(58) Field of Classification Search .................. 425/144, 425/547
See application file for complete search history.

(56) References Cited

U.S. PATENT DOCUMENTS

| 4,340,551 A | * | 7/1982 | Wada et al. | 264/403 |
| 4,732,554 A | * | 3/1988 | Hellmann | 425/139 |
| 5,000,654 A | * | 3/1991 | Shiotani | 198/750.11 |
| 5,062,786 A | | 11/1991 | Arai | |
| 6,334,766 B1 | * | 1/2002 | McCormick | 425/165 |
| 6,485,285 B1 | * | 11/2002 | Shiotani | 425/139 |

FOREIGN PATENT DOCUMENTS

| CN | 101224627 A | 7/2008 |
| JP | 3393079 | 4/2003 |
| TW | 200508012 | 3/2005 |
| TW | 200706333 | 2/2007 |

* cited by examiner

*Primary Examiner* — Jill Heitbrink
(74) *Attorney, Agent, or Firm* — Rabin & Berdo, P.C.

(57) ABSTRACT

An injection mold having pre-heating device, the pre-heating device, and method for pre-heating injection mold are provided. The pre-heating device includes a high frequency coil member and a transportation device having a Z axle servo motor, a Z axle linear sliding rail, an annular transportation belt and a lifting rack. The annular transportation belt is driven by the Z axle servo motor. The high frequency coil member is hung on the lifting rack. The lifting rack is moveably connected to the Z axle linear sliding rail, coupled to the annular transportation belt and is driven by the annular transportation belt to perform an ascent or descent movement along the Z axle linear sliding rail.

4 Claims, 5 Drawing Sheets

INJECTION MOLD HAVING PRE-HEATING DEVICE, THE PRE-HEATING DEVICE, AND METHOD FOR PRE-HEATING INJECTION MOLD

RELATED APPLICATIONS

This application claims priority to Taiwan Application Serial Number 98142363, filed Dec. 10, 2009, which is herein incorporated by reference.

BACKGROUND

1. Technical Field

The disclosure relates to a pre-heat device, more particularly to an injection mold having pre-heating device, the pre-heating device, and method for pre-heating injection mold.

2. Description of Related Art

A conventional procedure for plastic injection molding includes steps as followings: firstly plastic material is introduced to a feeding pipe of an injection molding machine so as to obtain a melted plastic material, secondly, an operation of engaging molds is processed so the melted plastic material can be injected into a die cavity, then, pressure holding of the injection molding machine, cooling, demolding are processed in sequence and finally the finished goods are moved out of the molds.

In the process of injecting molding, the die temperature would influence the shrinkage, deformation, melting engagement lines, and surface brightness of appearance of the finished plastic goods, and also molding circles.

For solving said concerns, a conventional die (oil) heating machine or an electric heating rod is introduced to heat the dies before injection molding. However, keeping the dies in a high-pressure condition through the way, the cooling time and cycle time are prolonged so that the production rate is therefore influenced.

Another application of rapidly cooling/heating dies is passing high pressure steam through a water route installed in the die core, and introduces cooling water through the water route for cooling the dies after the plastic material is injected in the die cavity. Since the water route is distributed inside the die core, disadvantage is that the operation of heating/cooling the die core would be influenced by the heat conduction efficiency of steel material of which the die is made, which leads to more than 20 seconds for transferring heat from the interior of the die core to the surface of the die core.

The other application for pre-heating dies is to utilize petrol/diesel combustion heating stove to generate water steam capable of rapidly passing through a water route installed in the dies. The application consumes relative more energy, and the carbon dioxide emission produced thereby does not meet the environmental protection requirements.

The other one application for pre-heating dies is to utilize flame generated by burning gas. The surfaces of the dies are heated by the flame so the surfaces can rapidly reach high temperature. However, gas burning is not only dangerous and difficult to control the temperature, but also dissatisfied with the requirement of environmental protection.

In view of the mentioned prior arts, how to develop a device and a method for pre-heating die for improving the mentioned disadvantages shall be concerned.

SUMMARY

The present disclosure provides an injection mold having pre-heating device, the pre-heating device, and method for pre-heating injection mold; wherein the heating process is done by electromagnetic induction generated by high frequency coils for ensuring safety and rapid molding, saving energy and cost; and a servo motor is utilized to drive a transportation belt to perform a vertical and linear movement for providing a precise transportation route.

The injection mold having pre-heating device includes a male die, a female die and a pre-heating device. The pre-heating device includes a high frequency coil member and a transportation device. The high frequency coil member is used to introduce electromagnetic inductions. The transportation device includes a fixed rack and a lifting rack. The fixed rack has a Z axle servo motor, a first Z axle linear sliding rail and an annular transportation belt. The annular transportation belt is connected to the Z axle servo motor so as to be driven by the operations of the Z axle servo motor. One end of the lifting rack hangs the high frequency coil member, the other end thereof has a second Z axle linear sliding rail coupled to the annular transportation belt and moveably connected to the first Z axle linear sliding rail.

Then the Z axle servo motor drives the annular transportation belt to operate, the lifting rack is driven by the annular transportation belt to perform an ascent or descent movement along the first Z axle linear sliding rail, so the high frequency coil member is descended to be positioned between the male die and the female die, and the surface of the male die or the female die is pre-heated by the high frequency coil member.

In another embodiment of this invention, the lifting rack further includes a rack member, an X axle servo motor and a horizontal member rack. The X axle servo motor is disposed at one side of the rack member, and has an X axle ball screw. The horizontal moving rack is moveably installed on the X axle ball screw and for hanging the high frequency coil member.

Because the distance between the high frequency coil member and the surface of the male or female dies effects the heating efficiency and the temperature stability, the distance between the high frequency coil member and the surface of the male die or the female die can be precisely controlled through the X axle servo motor and the X axle ball screw.

The present disclosure can precisely control the movement of the high frequency coil member in the X axle (horizontal) direction, so the possibility of losing energy of high frequency will be reduced and a unifying heating effect will be provided.

The method for pre-heating injection mold is implemented on the mentioned pre-heating device. The method includes steps of separating a male die and a female die, and linearly moving a high frequency coil member along a vertical direction so as the high frequency coil member is positioned between the male die and the female die, and facing a die cavity of the female die, and linearly moving the high frequency coil member along a horizontal direction so as the high frequency coil member is positioned to close the surface of the die cavity of the female die, and introduce electromagnetic induction by the high frequency coil member on the surface of the die cavity for heating the die cavity.

Besides, due to the heat conduction of the present invention is from outside to inside for heating the surface of the die core, the thermal energy conducted into the interior of the die core is not very much, the cooling time after injection molding is therefore reduced, so an environmental friendly procedure is provided, and the molding circle efficiency will be raised and the total working hours of injection molding will be shortened.

DESCRIPTION OF THE PREFERRED EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The present disclosure provides an injection mold having pre-heating device, the pre-heating device, and a method for pre-heating injection mold.

Figure 1:
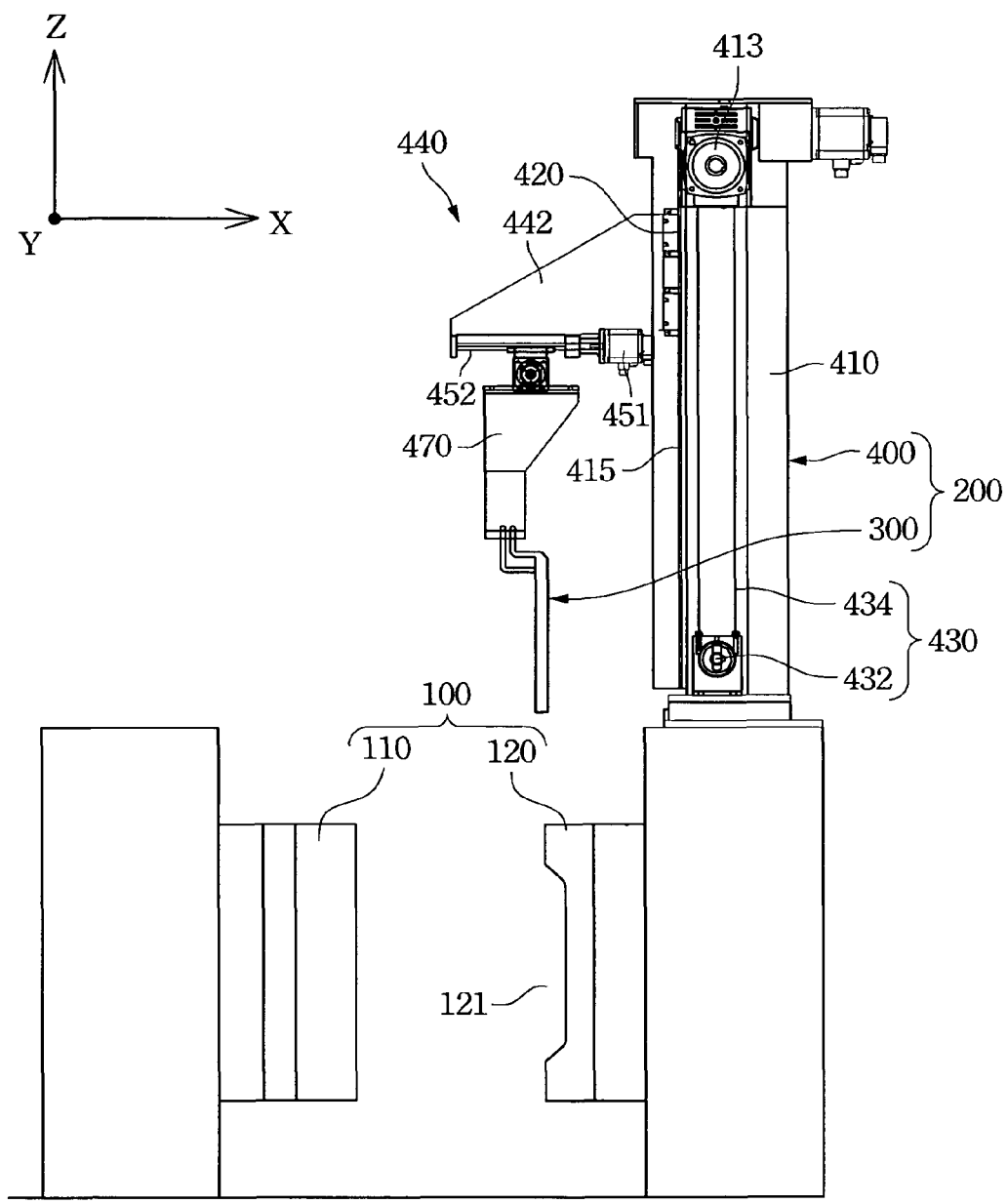
FIG. 1 illustrates a structural schematic view of the injection mold having pre-heating device of one embodiment of the present disclosure.
Figure 2:
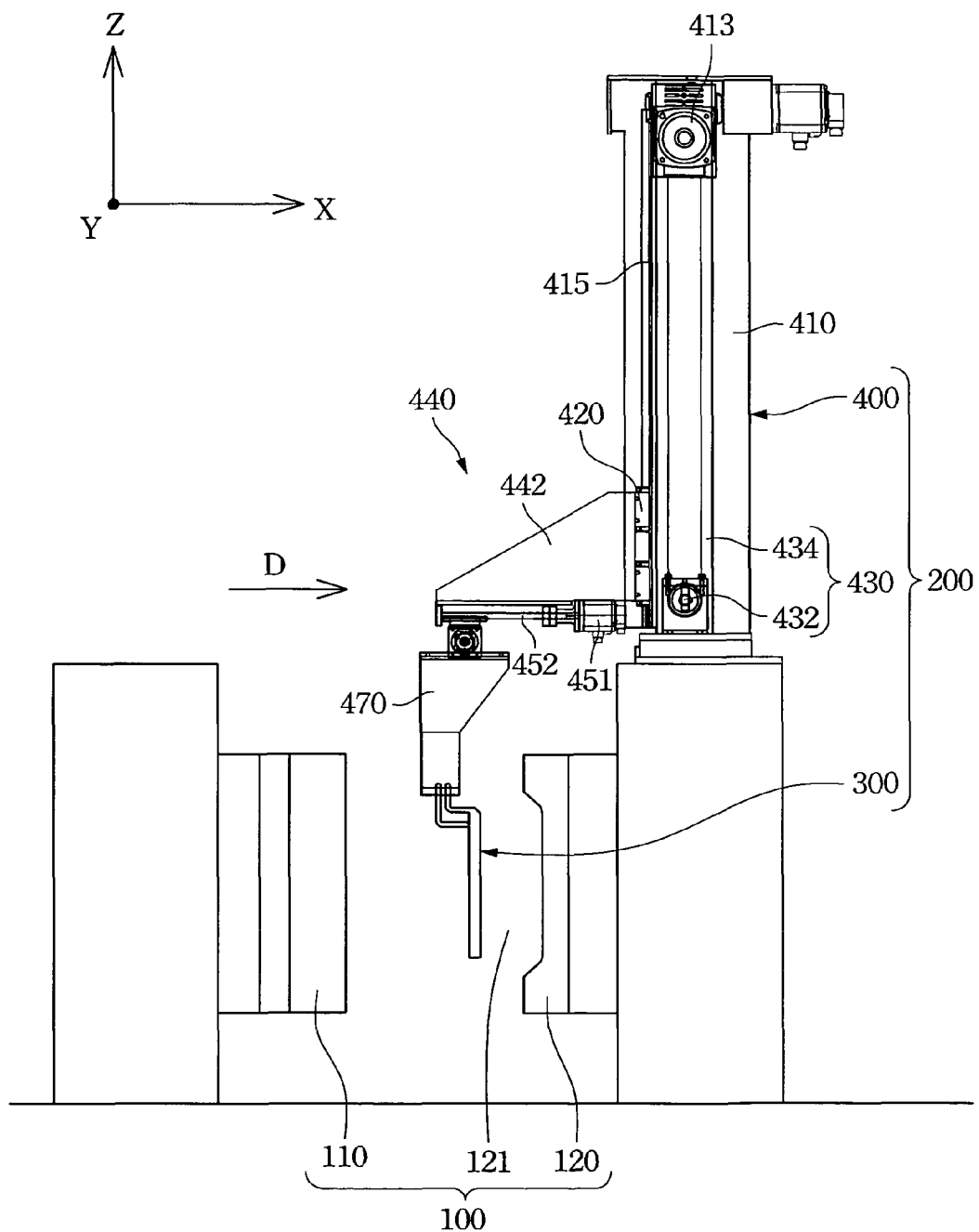
FIG. 2 illustrates a schematic view illustrating the injection mold having pre-heating device of this embodiment being moved along the Z axle linear sliding rails.
Figure 3:
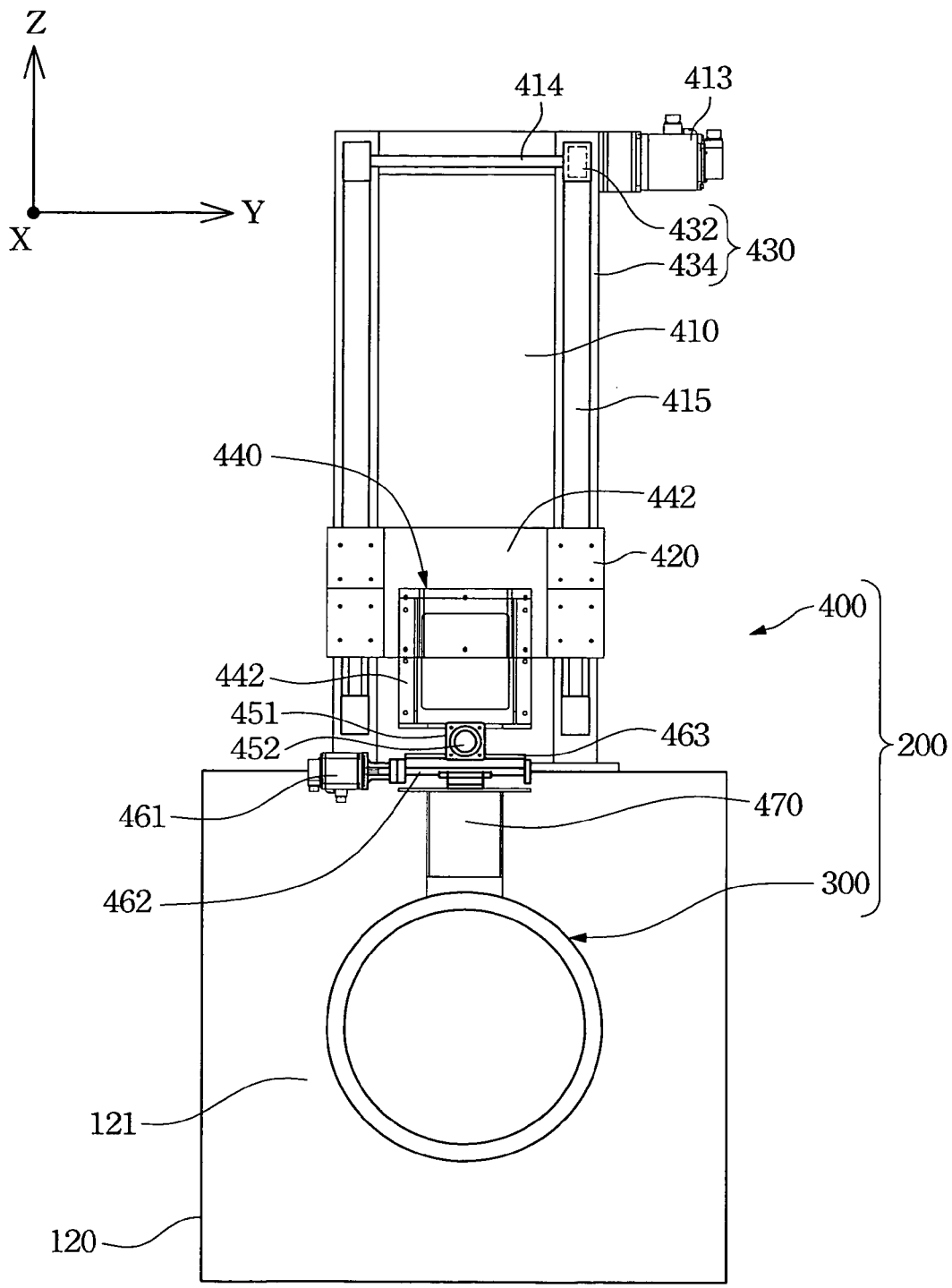
FIG. 3 illustrates a front view of the pre-heating device in FIG. 2.

Referring from FIG. 1 to FIG. 3, wherein FIG. 1 is a structural schematic view of the injection mold having pre-heating device of one embodiment of the present disclosure; FIG. 2 is a schematic view illustrating the injection mold having pre-heating device of this embodiment being moved along the Z axle linear sliding rails; FIG. 3 is a front view of the pre-heating device in FIG. 2 in a "D" direction.

The pre-heating device 200 of the injection mold 100 which is served to pre-heat a male die 110 and a female die 120 of the injection mold 100 before the injection mold 100 is filled with plastic material, in which the male die 110 and the female die 120 are capable of engaging or separating from each other.

The pre-heating device 200 includes a high frequency coil member 300 and a transportation device 400. The transportation device 400 is connected to the high frequency coil member 300 for driving the high frequency coil member 300 to move along a Z axle direction (so-called vertical direction), through a transportation belt of a servo motor, so as to position the high frequency coil member 300 between the male die 110 and the female die 120 for pre-heating the male die 110 and the female die 120 (as shown in FIG. 2).

In one embodiment of the present disclosure, the pre-heating device 200 for example, is fastened on the female die 120 of the injection mold 100. The transportation device 400 includes a fixed rack 410 and a lifting rack 440. The lifting rack 440 hangs the high frequency coil member 300 and performs a reciprocal ascent or descent movement with respect to the fixed rack 410, so as to drive the high frequency coil member 300 up or down together.

Substantially, the fixed rack 410 is provided with a Z axle servo motor 413, two first Z axle linear sliding rails 415 and two annular transportation belts 430 (as shown in FIG. 3). The two first Z axle sliding rails 415 are disposed at two opposite sides of one surface of the fixed rack 410. Each annular transportation belt 430 is disposed approximately and correspondingly to one of the first Z axle linear sliding rails 415 and is connected to the Z axle servo motor 413. Thus, the annular transportation belt 430 can be driven to rotate clockwise or counterclockwise when the Z axle servo motor 413 is operated.

The lifting rack 440 includes a rack member 442. The rack member 442 is coupled to the annular transportation belts 430, and two opposite sides of the rack member 442 are respectively installed with a second Z axle linear sliding rail 420, and each second Z axle linear sliding rail 420 is respectively corresponding to one of the first Z axle linear sliding rails 415.

Since the first Z axle linear sliding rails 415 is engaged on the second Z axle linear sliding rails 420, the rack member 442 is moveably installed on the fixed rack 410 and performs a Z axle ascent or descent movement along the first Z axle linear sliding rails 415 synchronously with the operation of the annular transportation belt 430.

In practice, each annular transportation belt 430 includes plural transportation wheels 432 and a synchronization belt 434. The synchronization belt 434 is installed on the transportation wheels 432 and is coupled to the second Z axle linear sliding rails 420. One transmission shaft 414 of the Z axle servo motor 413 is engaged with one of the transportation wheels 432. So when the transmission shaft 414 of the Z axle servo motor 413 is rotated, the transportation wheel 432 synchronously drives the synchronization belt 434 to rotate. For example, when the synchronization belt 434 is counterclockwise rotated, the lifting rack 440 descends along the Z axle linear sliding rails 420, and vice versa (as shown in FIG. 2).

Figure 4:
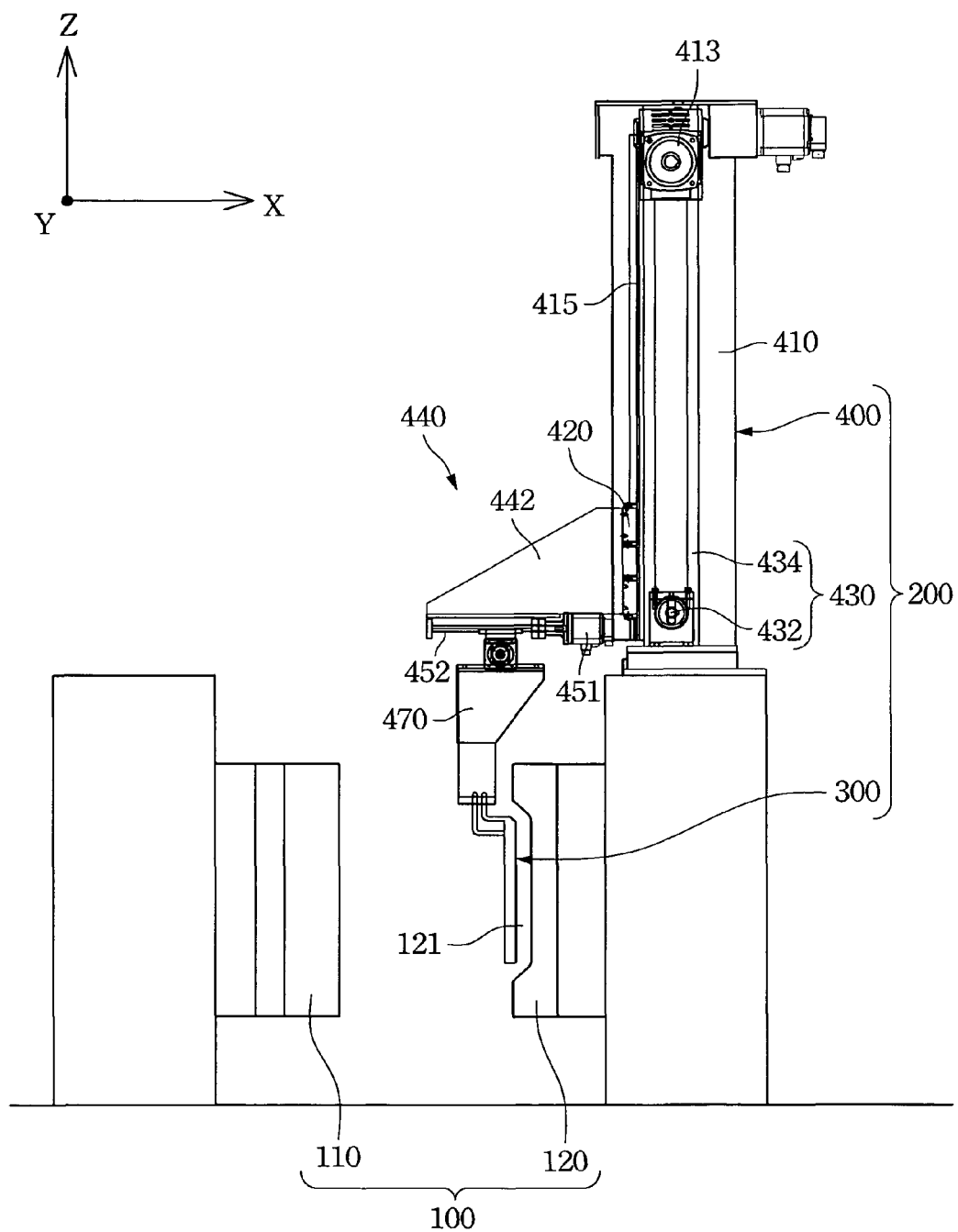
FIG. 4 illustrates a schematic view illustrating the injection mold having pre-heating device of this embodiment being moved along the X axle ball screw.

Referring to FIG. 3 and FIG. 4, wherein FIG. 4 is a schematic view illustrating the injection mold having pre-heating device of this embodiment moved along the X axle.

When the high frequency coil member 300 is moved to position between the male die 110 and the female die 120, the pre-heating device 200 drives the high frequency coil member 300, with a manner of driving a ball screw to rotate by a servo motor, to move close to a die cavity 121 of the female die 120 along an X axle direction (so called one of the horizontal directions). Thus, the surface of the die cavity 121 of the female die 120 could be pre-heated by the high frequency coil member 300 sufficiently.

The lifting rack 440 is further installed with an X axle servo motor 451 and a horizontal moving rack 470. The X axle servo motor 451 is disposed at one side of the rack member 442, and has an X axle linear ball screw 452. The horizontal moving rack 470 is moveably installed on the X axle linear ball screw 452, and, through the X axle servo motor 451 driving the X axle linear ball screw 452, the horizontal moving rack 470 can be moved on the X axle linear ball screw 452 along the X axle direction.

Thus, the position of the horizontal moving rack 470 on the X axle linear ball screw 452 is able to be precisely controlled (as shown in FIG. 4). Accordingly, the high frequency coil member 300 thereon can be driven to move along the X axle direction so as to be horizontally close to or spaced away from the die cavity 121 of the female die 120 (as shown in FIG. 4).

Similar to the way of driving the horizontal moving rack 470 to move along the X axle direction, the present disclosure also provides a way of driving the horizontal moving rack 470 to move along a Y axle direction (another of the horizontal directions perpendicular to the X axle and Z axle directions), so the high frequency coil member 300 can be horizontally moved close to or spaced away from the die cavity 121 (as shown in FIG. 3).

The lifting rack 440 is further provided with a Y axle servo motor 461. The Y axle servo motor 461 includes a Y axle linear ball screw 462 and a connection member 463. The Y axle linear ball screw 462 is installed on the connection member 463. The connection member 463 is moveably installed on the X axle ball screw 452. The horizontal moving rack 470 is moveably connected on the Y axle linear ball screw 462.

Therefore, the horizontal moving rack 470 not only can be moved along the X axle direction on the X axle linear ball screw 452, but also can be moved along the Y axle direction on the Y axle linear ball screw 462 through the Y axle servo motor 461 rotating the Y axle linear ball screw 462, so that the high frequency coil member 300 is horizontally moved close to or spaced away from the die cavity 121 (as shown in FIG. 3). Thus, the position of the horizontal moving rack 470 on the Y axle linear ball screw 462 is able to be precisely controlled through the Y axle servo motor 461 rotating the Y axle linear ball screw 462 (as shown in FIG. 3).

A magnetic field would be generated while passing electric current through the high frequency coil member 300, and eddy current is accumulated on a surface of the die core within a very short time when the high frequency coil member 300 with the magnetic field is placed close to the die cavity 121 of the female die 120. The generated thermal energy is gained from electric resistance heat and magnetic hysteresis loss. The present disclosure directly heats the surface of the die core, so that the temperature of the die rising from 60° C. to 220° C. only takes 2~3 seconds.

In one embodiment, the pre-heating device 200 is disposed on the upper end of the male die 110 or the upper end of the female die 120, for example, disposed on the top surface of the female die 120 or the top surface of the male die 110 (as shown in each figure), so the pre-heating device 200 is able to be integrated in the injection mold 100. However, the pre-heating device 200 is not limited to be disposed on the upper end of the male die 110 or the female die 120, the pre-heating device 200 can also be disposed at two lateral sides of the male die 110 or the female die 120.

Figure 5:
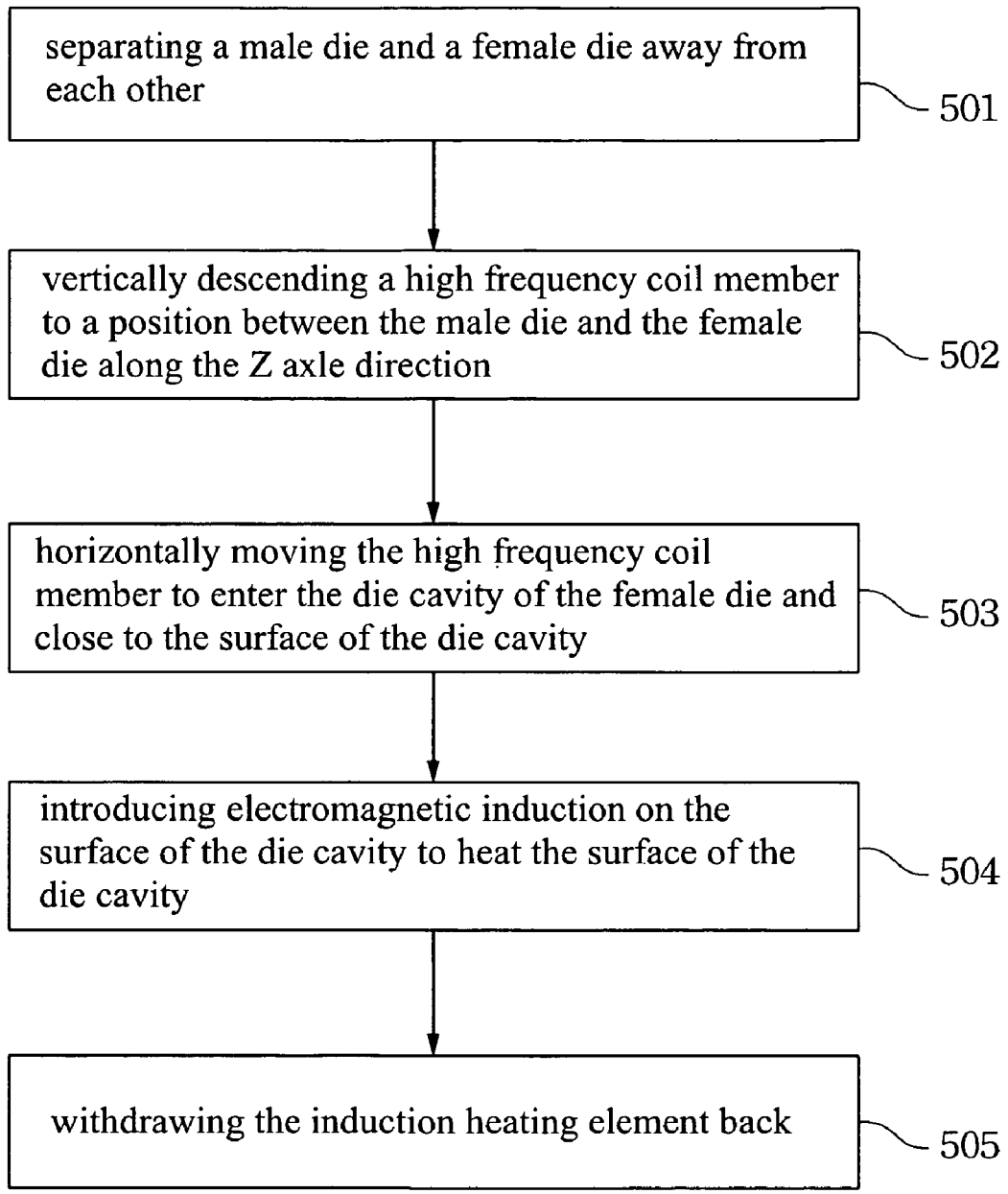
FIG. 5 illustrates a flowchart illustrating the pre-heating method for injection mold of another embodiment of the present disclosure.

Referring from FIG. 1 to FIG. 5, wherein FIG. 5 is a flowchart illustrating the method for pre-heating injection mold of another embodiment of the present disclosure. The present disclosure discloses a method for pre-heating injection mold 100 which is implemented to operate with the mentioned pre-heating device 200, the method has steps disclosed in an embodiment of this invention as follows.

Step 501: separating the male die 110 and the female die 120 away from each other.

Step 502: vertically descending the high frequency coil member 300 to a position between the male die 110 and the female die 120 along the Z axle direction.

In this step, when the Z axle servo motor 413 is actuated, the Z axle servo motor 413 operates the transmission shaft 414 to rotate, the synchronization belt 434 then is synchronously rotated with the transmission shaft 414, so as to descend the lifting rack 440. Thus the high frequency coil member 300 is moved into a gap or space defined between the male die 110 and the female die 120 (as shown in FIG. 2), and the high frequency coil member 300 is aligned to face the die cavity 121 of the female die 120. In this step, the high frequency coil member 300 also is actuated to generate electromagnetic inductions.

Step 503: horizontally moving the high frequency coil member 300 close to the surface of the die cavity 121.

In this step, when the X axle servo motor 451 is actuated, the X axle servo motor 451 drives the X axle linear ball screw 452 to rotate so as to move the horizontal moving rack 470 along the X axle direction, and the horizontal moving rack 470 drives the high frequency coil member 300 to be close the surface of the die cavity 121 (as shown in FIG. 4).

Further, this step can optionally include driving the horizontal moving member 470 to move along the Y axle direction on the Y axle linear ball screw 462 by the Y axle servo motor 461, so that the high frequency coil member 300 is horizontally moved close to the die cavity 121 along the Y axle direction (as shown in FIG. 3).

Step 504: generating electromagnetic induction on the surface of the die cavity 121 by the high frequency coil member 300 to heat the surface of the die cavity 121.

Step 505: when the surface of the die cavity 121 is heated to a pre-determined temperature, withdrawing the high frequency coil member 300 disposed on the lifting rack 440 by controlling the X axle servo motor 451 and the Z axle servo motor 413 in sequence.

In this step, when the surface of the die cavity 121 is heated to a pre-determined temperature, the high frequency coil member 300 is reversely moved by the X axle servo motor 451, so the high frequency coil member 300 is spaced away from the die cavity 121 of the female die 120, then the lifting rack 440 is lifted by the Z axle servo motor 413 so the high frequency coil member 300 is removed from the gap defined between the male die 110 and the female die 120, so that the male die 110 and the female die 120 can be engaged together for sequent steps.

In this step, the high frequency coil member 300 also can be terminated, so the high frequency coil member 300 stops generating the electromagnetic induction.

After the steps mentioned above, processes like filling plastic material, pressure holding, cooling, and demolding for obtaining finished goods are processed, so a single circulation injection formation is completed.

Compared with various pre-heating methods disclosed in prior arts, the device and method of the present disclosure can shorten the heating time for generating enough thermal energy on the surface of the die cavity so total working hour of a single circulation injection formation is shortened. Moreover, the present disclosure provides a safer and cost-efficient solution, electromagnetic induction generated by the high frequency coil member and transporting the high frequency coil member into the injection mold through a transportation belt, so a stable and convenient transportation route is provided.

The reader's attention is directed to all papers and documents which are filed concurrently with his specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. An injection mold having pre-heating device, comprising:
   a male die;
   a female die having a die cavity facing to the male die; and
   a pre-heating device disposed on a top surface of the female die, and comprising:
   a high frequency coil member for introducing electromagnetic induction; and
   a transportation device, comprising:
      a fixed rack securely disposed on the top surface of the female die, and having a Z axle servo motor installed on the fixed rack, a first Z axle linear sliding rail installed on the fixed rack, and an annular transportation belt connected to the Z axle servo motor so as to be driven by the operation of the Z axle servo motor; and
   a lifting rack comprising:
      a rack member coupled to the annular transportation belt, horizontally extending from one side of the fixed rack with one end thereof to be configured over the die cavity, and having a second Z axle linear sliding rail coupled to the annular transportation belt and moveably connected to the first Z axle linear sliding rail with the other end thereof;
      an X axle servo motor disposed at one side of the rack member, and having an X axle ball screw; and a horizontal moving rack moveably installed on the X axle ball screw and hanging the high frequency coil member, wherein when the Z axle servo motor drives the annular transportation belt to operate, the lifting rack is driven by the annular transportation belt to perform a vertically ascent or descent movement along the first Z axle linear sliding rail so as to be moved into or out from the space between the male die and the female die, when the lifting rack is in the space between the male die and the female die, and the X axle servo motor drives the X axle ball screw to rotate, the horizontal moving rack is horizontally moved into the die cavity of the female die, the high frequency coil member is linearly moved along a horizontal direction to close to a surface of the die cavity of the female die.

2. The injection mold having pre-heating device as claimed in claim 1, wherein the Z axle servo motor further comprises a transmission shaft;

the annular transportation belt further comprises:
a plurality of transportation wheels, one of the transportation wheels is engaged with the transmission shaft; and
a synchronization belt coupled to the second Z axle linear sliding rail and installed on the transportation wheels.

3. A pre-heating device of injection mold implemented for pre-heating surfaces of a male die and a female die, comprising:

a transportation device, comprising:
a fixed rack disposed on a top surface of the female die; and
a Z axle servo motor installed on the fixed rack;
a first Z axle linear sliding rail installed on the fixed rack;
an annular transportation belt connected to the Z axle servo motor and driven by the operation of the Z axle servo motor; and a lifting rack comprising:
a rack member horizontally extending from one side of the fixed rack to be configured over a space between the male die and the female die, and having a second Z axle linear sliding rail coupled to the annular transportation belt and moveably connected to the first Z axle linear sliding rail for being driven by the operation of the annular transportation belt to perform a vertically ascent or descent movement along the Z axle linear sliding rail; and an X axle servo motor disposed at one side of the rack member, and having an X axle ball screw; and a horizontal moving rack moveably installed on the X axle ball screw, wherein when the X axle servo motor drives the X axle ball screw to rotate, the horizontal moving rack is horizontally moved into the die cavity of the female die to linearly move along a horizontal direction towards the female die; and a high frequency coil member hung on the horizontal moving rack for introducing electromagnetic induction on the surface of the male die or the female die when the high frequency coil member is descended to a position between the male die and the female die, and moved along the horizontal direction to close to a surface of the die cavity of the female die.

4. The pre-heating device of injection mold as claimed in claim 3, wherein the Z axle servo motor further comprises a transmission shaft;

the annular transportation belt further comprises:
a plurality of transportation wheels, wherein one of the transportation wheels is engaged with the transmission shaft; and
a synchronization belt coupled to the lifting rack and installed on the transportation wheels.

* * * * *